(12) United States Patent
Agbo et al.

(10) Patent No.: US 12,508,170 B2
(45) Date of Patent: Dec. 30, 2025

(54) MENSTRUAL CUP APPLICATORS AND METHODS OF USING THE SAME

(71) Applicants: Chidinma Agbo, Norwalk, CA (US); Caitlin Klauer, Andover, MA (US); Melissa Machado, Miami Gardens, FL (US); Kaylie Mings, Bellaire, TX (US); Morgan Zagerman, Franklin, TN (US)

(72) Inventors: Chidinma Agbo, Norwalk, CA (US); Caitlin Klauer, Andover, MA (US); Melissa Machado, Miami Gardens, FL (US); Kaylie Mings, Bellaire, TX (US); Morgan Zagerman, Franklin, TN (US)

( * ) Notice: Subject to any disclaimer, the term of this patent is extended or adjusted under 35 U.S.C. 154(b) by 654 days.

(21) Appl. No.: 17/804,723

(22) Filed: May 31, 2022

(65) Prior Publication Data

US 2022/0378627 A1 Dec. 1, 2022

Related U.S. Application Data

(60) Provisional application No. 63/195,171, filed on May 31, 2021.

(51) Int. Cl.
| | |
|---|---|
| *A61F 13/15* | (2006.01) |
| *A61F 5/455* | (2006.01) |
| *A61F 13/20* | (2006.01) |
| *A61F 13/26* | (2006.01) |

(52) U.S. Cl.
CPC .......... *A61F 13/266* (2013.01); *A61F 5/4553* (2013.01); *A61F 13/2045* (2013.01)

(58) Field of Classification Search
CPC .... A61F 13/20; A61F 13/2045; A61F 5/4553; A61F 13/266
See application file for complete search history.

(56) References Cited

U.S. PATENT DOCUMENTS

| 2,008,380 | A | * | 7/1935 | Bachman | A61F 6/12 |
| | | | | | 604/60 |
| 3,404,682 | A | * | 10/1968 | Waldron | A61F 13/26 |
| | | | | | 128/838 |
| 2020/0330288 | A1 | * | 10/2020 | Duensing | A61F 13/26 |

FOREIGN PATENT DOCUMENTS

EP 616797 A1 * 9/1994 ............... A61F 6/12

* cited by examiner

*Primary Examiner* — Jacqueline F Stephens
(74) *Attorney, Agent, or Firm* — Norton Rose Fulbright US LLP

(57) ABSTRACT

Disclosed are menstrual cup applicators and methods of their use. Some applicators include a holder having a proximal end defining a first opening and a distal end defining a second opening, wherein the holder defines a channel extending between the first and second openings, the channel having a longitudinal axis and being configured to receive a menstrual cup, and a plunger having a shaft that is receivable by the first opening such that the shaft is movable within the channel along the longitudinal axis. In some applicators, the channel is bounded at the distal end by points on the holder that are positioned to facilitate containment of a menstrual cup within the channel. In some applicators, a maximum transverse dimension of the second opening is at least 1.5 times a maximum transverse dimension of the first opening.

18 Claims, 22 Drawing Sheets

MENSTRUAL CUP APPLICATORS AND METHODS OF USING THE SAME

CROSS-REFERENCE TO RELATED APPLICATION

This application claims the benefit of priority to U.S. Provisional Patent Application Ser. No. 63/195,171, filed on May 31, 2021, which is incorporated by reference herein in its entirety.

TECHNICAL FIELD

The present invention relates generally to feminine products, and more particularly but without limitation to menstrual cup applicators and methods of using the same.

BACKGROUND

Menstrual cups are designed to collect discharge during a female's period. They are often made of a flexible material like silicone or rubber and have a cup-shape, enabling them to be positioned within the vagina and to receive and hold such discharge. Menstrual cups are advantageous because they have a discharge-holding volume that reduces the need to change the menstrual cups, which in turn reduces the risk of infection posed by inserting products into and removing products from the vagina as well as the number of products used during a female's period.

Typically, to insert a menstrual cup into the vagina, a user must first thoroughly wash their hands to mitigate the risk of infection. The user then folds the menstrual cup onto itself so that it is compact enough to be inserted into the vagina. Once it is folded, the user inserts the menstrual cup with their fingers into the vagina with the menstrual cup's opening facing away from the point of entry. The menstrual cup then unfolds and presses against the vaginal wall such that it can capture discharge. This method, however, risks infection due to the user's potentially unsanitary fingers entering the vagina. And after the user's fingers are removed from the vagina, they may undesirably have discharge or other bodily fluids on them. This method can also be ineffective and/or uncomfortable. For example, if the user does not properly place the menstrual cup in the vagina or if the menstrual cup does not properly unfold, the menstrual cup may be mispositioned, resulting in discharge leaking past the menstrual cup and/or undue irritation of the vagina.

To address issues associated with inserting fingers into the vagina, a user can utilize a menstrual cup applicator. Conventional applicators have two walls that are parallel to one another and between which the user places the menstrual cup after it is folded. The user then inserts the applicator into the vagina and depresses a plunger to release the menstrual cup from between the applicator's walls. Such applicators, however, can be ineffective. For example, the menstrual cup can prematurely move out from between the applicator's walls, leading to mispositioning of the menstrual cup in the vagina and prompting its retrieval, typically with a user's fingers. Further, when positioned between the applicator's walls, portions of the menstrual cup may protrude from the applicator to an extent that causes discomfort as the menstrual cup is inserted into the vagina.

SUMMARY

Some of the present menstrual cup applicators comprise: a holder having a proximal end defining a first opening and a distal end defining a second opening, wherein the holder defines a channel extending between the first and second openings, the channel having a longitudinal axis and being configured to receive a menstrual cup, and a plunger having a shaft configured to be received by the first opening such that the shaft is movable within the channel and along the longitudinal axis of the channel. In some applicators, the channel is bounded at the distal end by first and second points on the holder that are angularly disposed from one another about the longitudinal axis by an angle of 180 degrees and third and fourth points on the holder that are angularly disposed between the first and second points about the longitudinal axis and angularly disposed from respective ones of the first and second points about the longitudinal axis by an angle that is between 50 and 85 degrees. In some applicators, a maximum transverse dimension of the second opening is at least 1.5 times a maximum transverse dimension of the first opening, each of the maximum transverse dimensions being measured perpendicularly to the longitudinal axis and between portions of the holder.

In some applicators, the holder includes a sidewall that defines at least a portion of the channel. In some applicators, a portion of the sidewall at the distal end subtends an angle of at least 270 degrees about the longitudinal axis. In some applicators, the angle subtended by the sidewall portion is less than 330 degrees. In some applicators, the sidewall flares toward the distal end.

In some applicators, the sidewall defines a slot extending from the proximal end and through the distal end. In some applicators, the sidewall defines a plurality of openings in fluid communication with the channel.

Some applicators comprise a latch configured to restrict movement of the shaft of the plunger out of the first opening of the holder. In some applicators, the latch is configured to restrict movement of the shaft of the plunger out of the first opening of the holder without restricting movement of the shaft toward the distal end of the holder.

In some applicators, the plunger defines an interior passageway configured to permit a string of the menstrual cup to pass through the plunger.

Some of the present methods of positioning a menstrual cup within a vagina comprise: disposing a menstrual cup within a channel of a holder, the channel extending between a proximal end of the holder that defines a first opening and a distal end of the holder that defines a second opening, the disposing such that a maximum transverse dimension of the menstrual cup and the holder is less than 1.5 times a maximum transverse dimension of the holder alone, wherein each of the maximum transverse dimensions is measured perpendicularly to a longitudinal axis of the channel, inserting the menstrual cup and the holder into the vagina, and actuating a plunger having a shaft received by the first opening such that the shaft moves within the channel and along the longitudinal axis to expel the menstrual cup from the channel via the second opening.

In some methods, disposing the menstrual cup within the channel is performed such that the menstrual cup is bounded by first and second points on the holder that are angularly disposed from one another about the longitudinal axis by an angle of 180 degrees and third and fourth points on the holder that are angularly disposed between the first and second points about the longitudinal axis and angularly disposed from respective ones of the first and second points about the longitudinal axis by an angle that is between 50 and 85 degrees. In some methods, a maximum transverse dimension of the second opening is at least 1.5 times a maximum transverse dimension of the first opening, each of the maximum transverse dimensions being measured perpendicularly to the longitudinal axis and between portions of the holder.

In some methods, the holder includes a sidewall that defines at least a portion of the channel and bounds the menstrual cup when the menstrual cup is disposed within the channel. In some methods, a portion of the sidewall that bounds the menstrual cup when the menstrual cup is disposed within the channel subtends an angle of at least 270 degrees about the longitudinal axis. In some methods, the angle subtended by the sidewall portion is less than 330 degrees.

In some methods, the sidewall defines a slot extending from the proximal end and through the distal end, and disposing the menstrual cup within the channel is performed by passing at least a portion of the menstrual cup through the slot. In some methods, the sidewall defines a plurality of openings in fluid communication with the channel.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in ways other than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale, meaning, in each, the sizes of the depicted elements are accurate relative to each other for at least the depicted embodiment.

DETAILED DESCRIPTION

Figure 1:
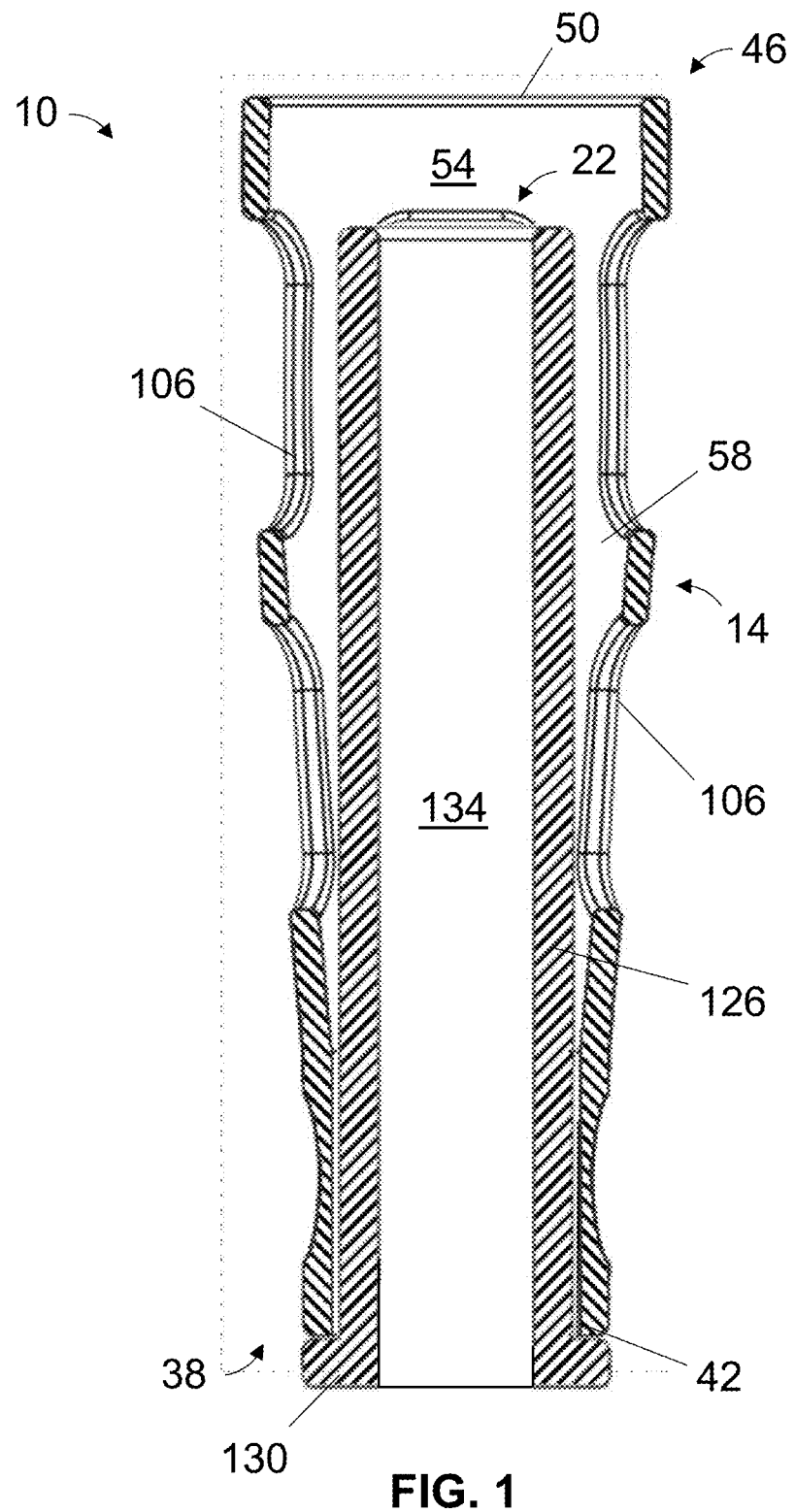
FIG. 1 is a cross-sectional side view of one of the present menstrual cup applicators, which includes a holder configured to receive a menstrual cup and a plunger configured to expel the menstrual cup from the holder.

Referring to FIG. 1, shown is an embodiment 10 of the present menstrual cup applicators. Applicator 10 includes a holder 14 configured to receive a device for insertion into the vagina, such as a menstrual cup (e.g., 18, FIG. 3) or a birth control device (e.g., a NuvaRing®, diaphragm, or the like) and a plunger 22 configured to expel the device from the holder. For example, holder 14 can include a proximal end 38 defining a first opening 42, a distal end 46 defining a second opening 50, and a channel 54 extending between the first and second openings, where the channel is configured to receive the device. And first opening 42 can receive plunger 22 such that a shaft 126 of the plunger is movable within channel 54 and along a longitudinal axis 62 (FIG. 2I) of the channel to expel the device from the channel at least in part through second opening 50. Second opening 50 and/or channel 54 may vary in dimension (e.g., depth, width, cross-sectional area, and/or the like) depending on the device to be inserted into the vagina.

Holder 14 is configured to surround the menstrual cup. In this way, to illustrate, channel 54 can house the device (e.g., menstrual cup 18) such that the device has a width that is similar to the width of the distal end of holder 14 (described in more detail below with respect to FIG. 4). For example, channel 54 at distal end 46 can be bounded by first and second points (e.g., 74A and 74B) on the holder that are angularly disposed from one another about longitudinal axis 62 by an angle of approximately 180 degrees (FIG. 2I). Also at distal end 46, channel 54 can be further bounded by third and fourth points (e.g., 74C and 74D) on the holder that are angularly disposed between the first and second points about the longitudinal axis (i.e., within the same approximately 180-degree angular interval between the first and second points). And each of the third and fourth points can be angularly disposed from respective ones of the first and second points about the longitudinal axis by an angle 78 that is greater than 45 degrees (e.g., greater than or equal to any one of 50, 55, 60, 65, 70, 75, or 80 degrees) and less than 90 degrees (e.g., less than or equal to any one of 85, 80, 75, 70, 75, 70, 65, 60, or 55 degrees). As shown, channel 54 can be bounded by points on holder 14 other than those described above.

For further example, holder 14 can include a sidewall 58 that defines at least a portion of channel 54, and a portion of the sidewall at distal end 46 can (e.g., continuously) subtend an angle (e.g., angle 82, FIG. 2I) of at least 180 degrees about longitudinal axis 62. The angle subtended by sidewall 58 can be less than 330 degrees as shown, for example, to form a slot 120 (described in more detail below). Provided by way of illustration, the angle subtended by the sidewall can be equal to any one of, or between any two of: 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, and 360 degrees. In these ways and others, a menstrual cup (e.g., 18) or other device for insertion into the vagina can be better-contained by holder 14, improving user comfort and promoting reliable device positioning within the vagina.

Holder 14 can be flared. To illustrate, a maximum transverse dimension 110 (FIG. 2H) of second opening 50 can be at least 1.1, 1.2, 1.3, 1.4, 1.5, 1.6, 1.7, 1.8, 1.9, or 2.0 times (e.g., at least 1.5 times) a maximum transverse dimension 114 of first opening 42. The maximum transverse dimensions for first opening 42 and second opening 50 can be measured perpendicularly to longitudinal axis 62 and between portions of holder 14. Via such flaring, a menstrual cup (e.g., 18) or other device can be better guided to its deployed shape in the vagina, which promotes reliable deployment and reduces the risk of the device "snapping" into shape, which can cause discomfort.

Holder 14 can include one or more openings 106. Opening(s) 106 can reduce friction when inserting the device (e.g., menstrual cup 18), which can provide a more comfortable experience for the user. Opening(s) 106 can each have any suitable shape; for example, the opening(s) can be circular, elliptical, triangular, rectangular, and/or the like. Illustrating this, FIGS. 7A-7D show another embodiment 14b of a holder that is substantially similar to holder 14, with the primary exception that holder 14b has differently-shaped openings 106 than holder 14's.

Figure 2A:
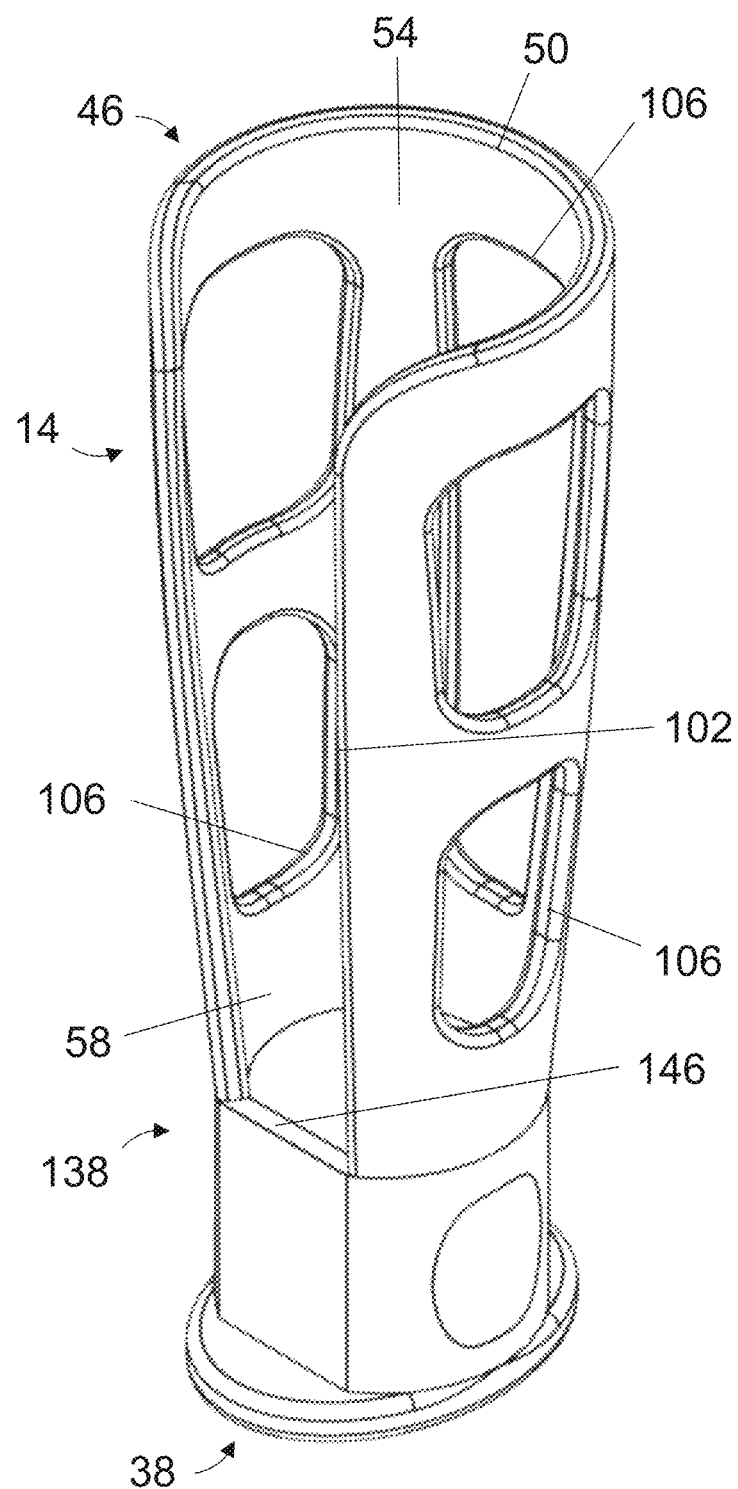
FIG. 2A is a perspective view of the holder of FIG. 1's applicator.
Figure 2B:
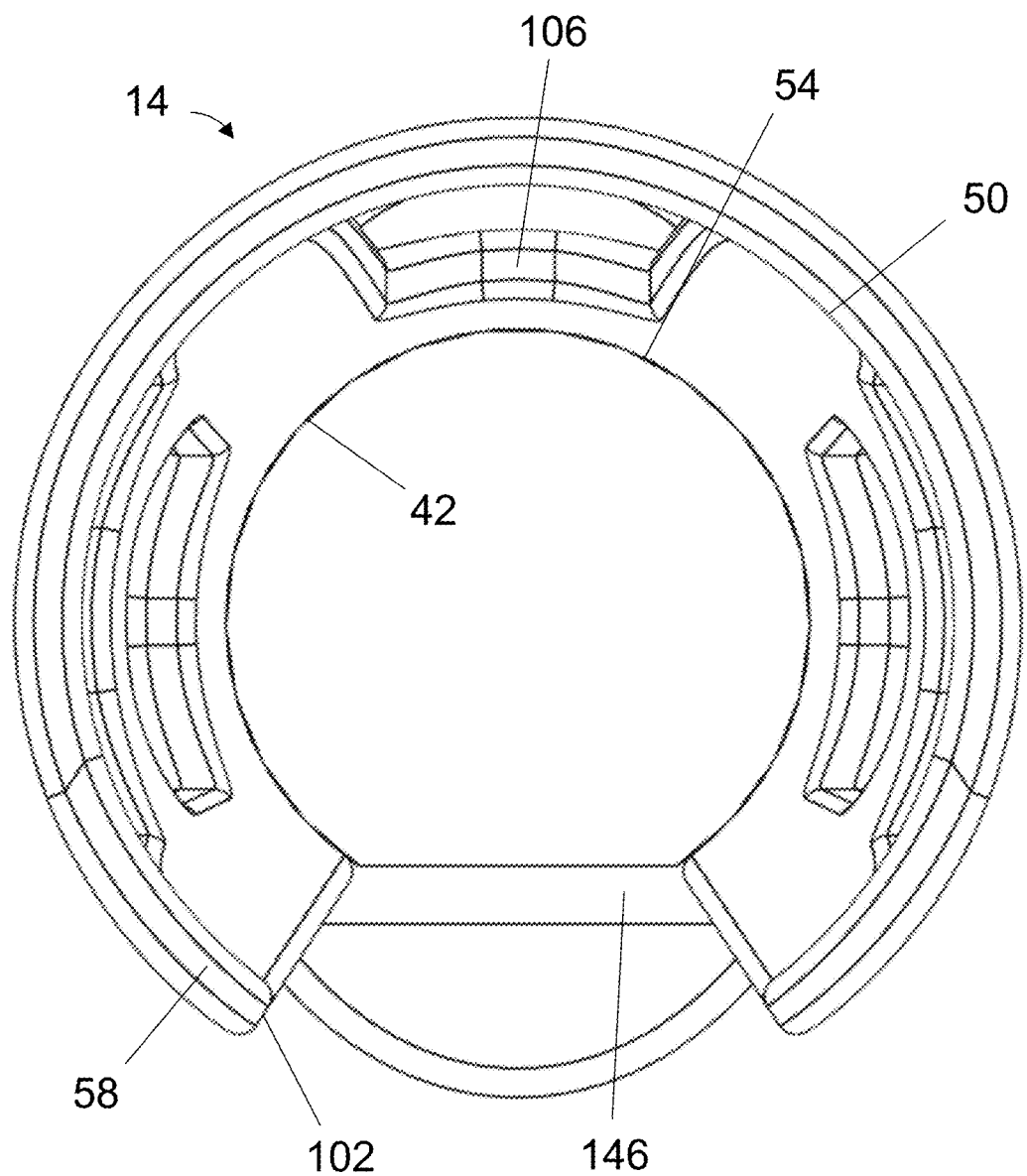
FIGS. 2B-2G are top, bottom, right, left, front, and back views, respectively, of the holder of FIG. 2A.
Figure 2C:
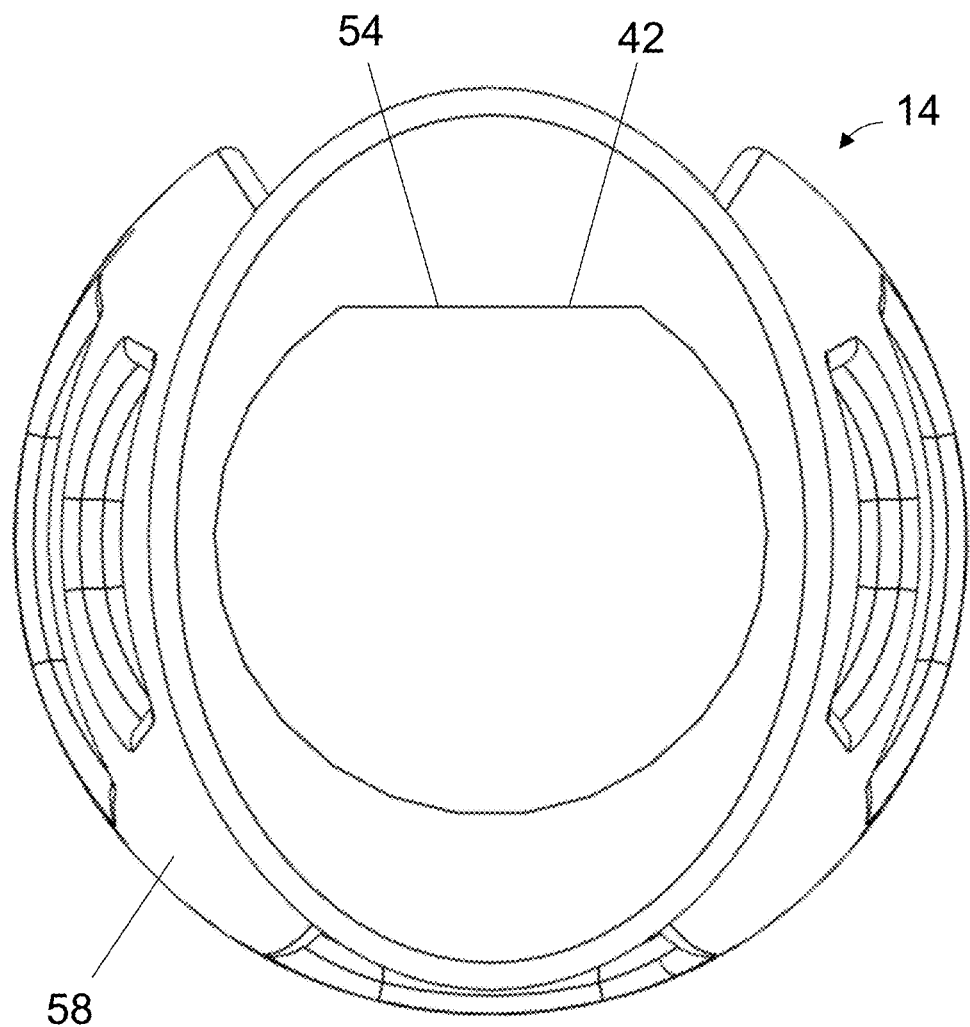
Figure 2D:
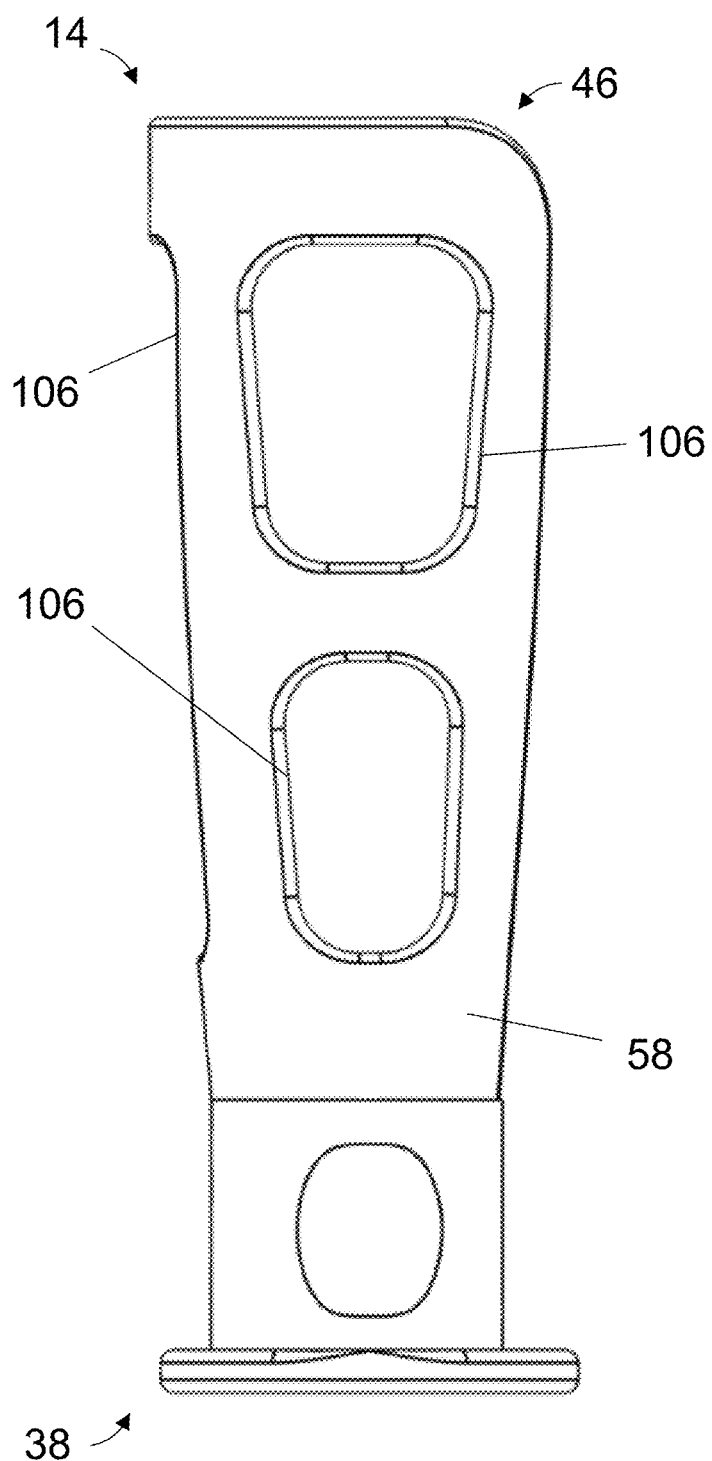
Figure 2E:
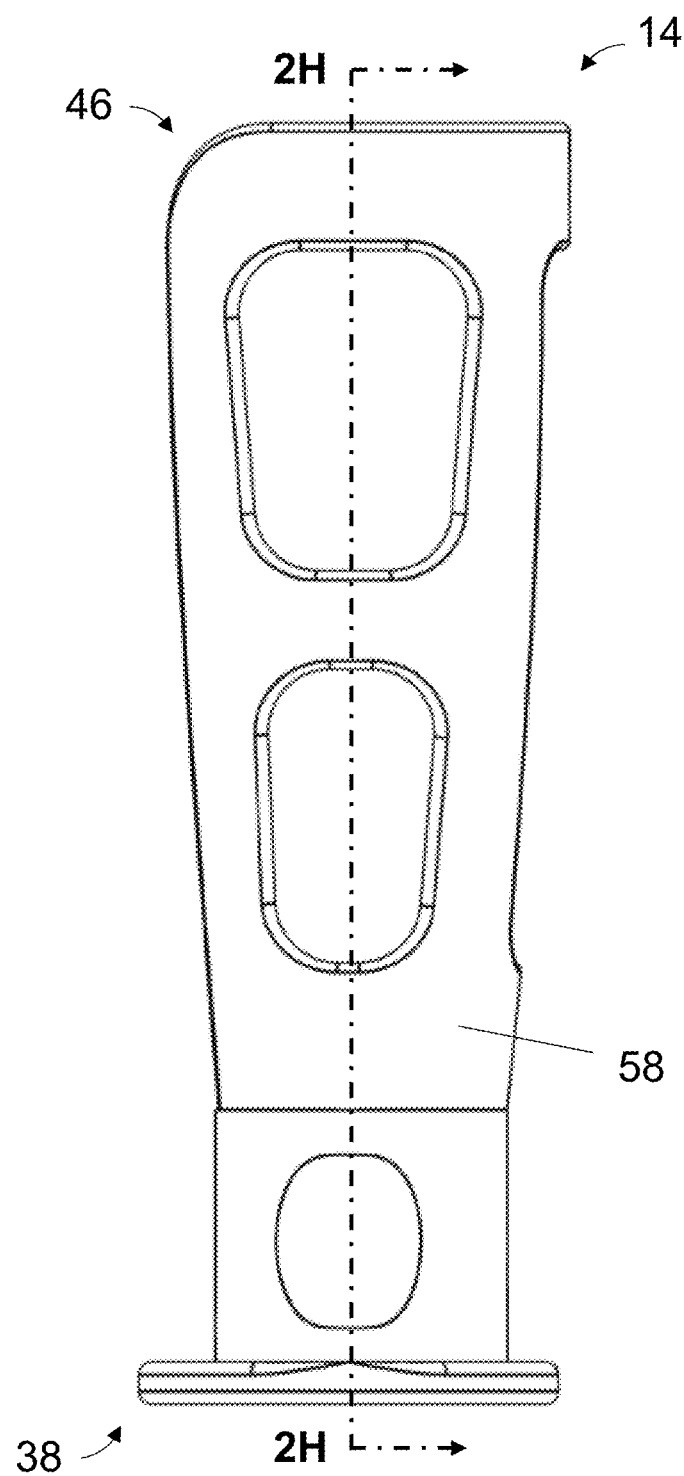
Figure 2F:
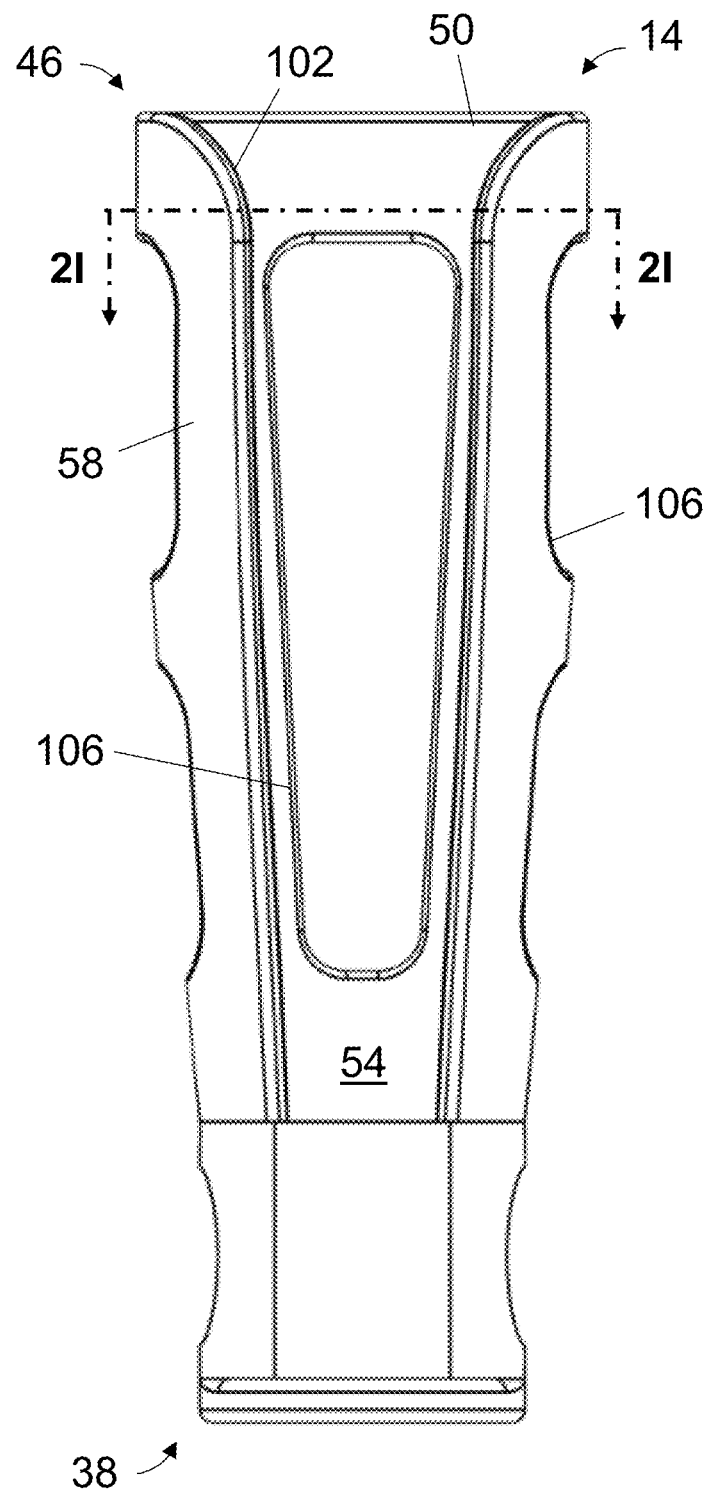
Figure 2G:
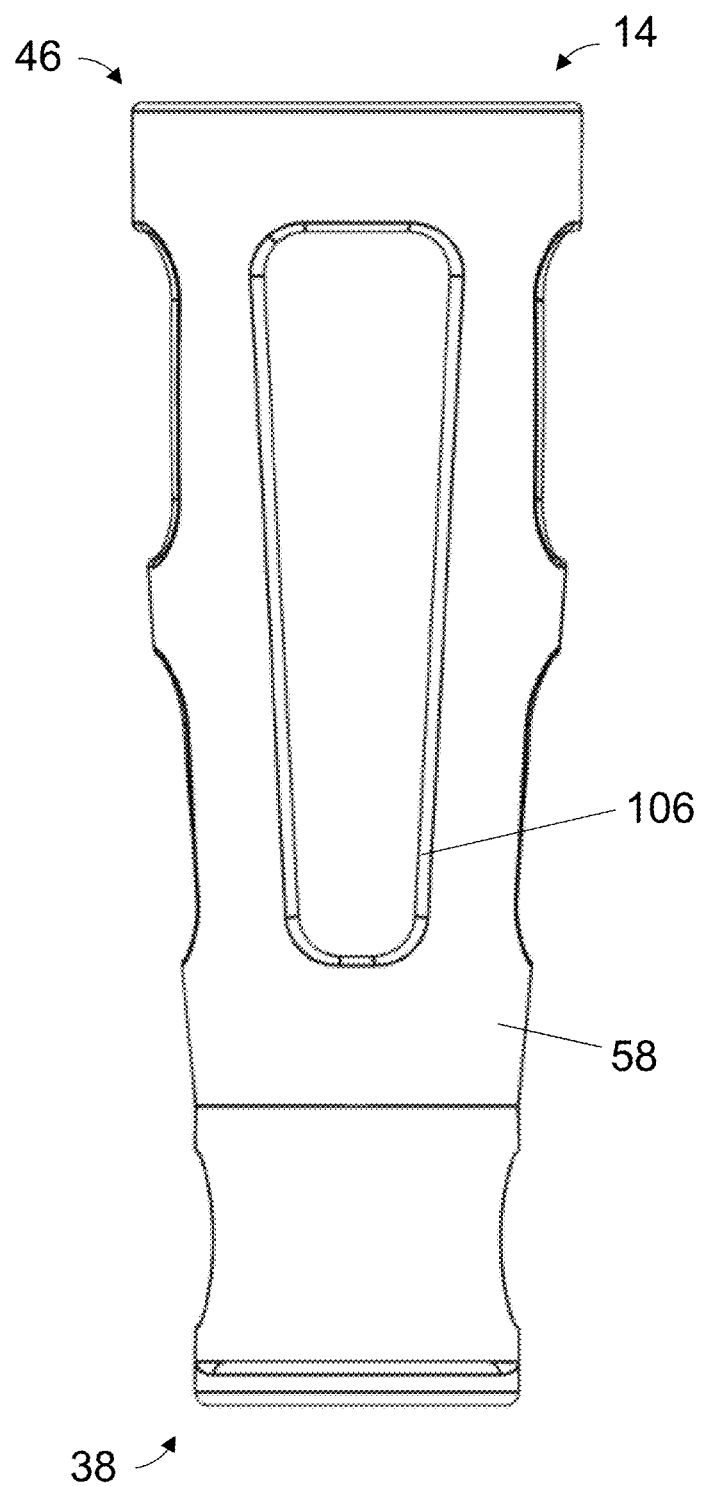
Figure 2H:
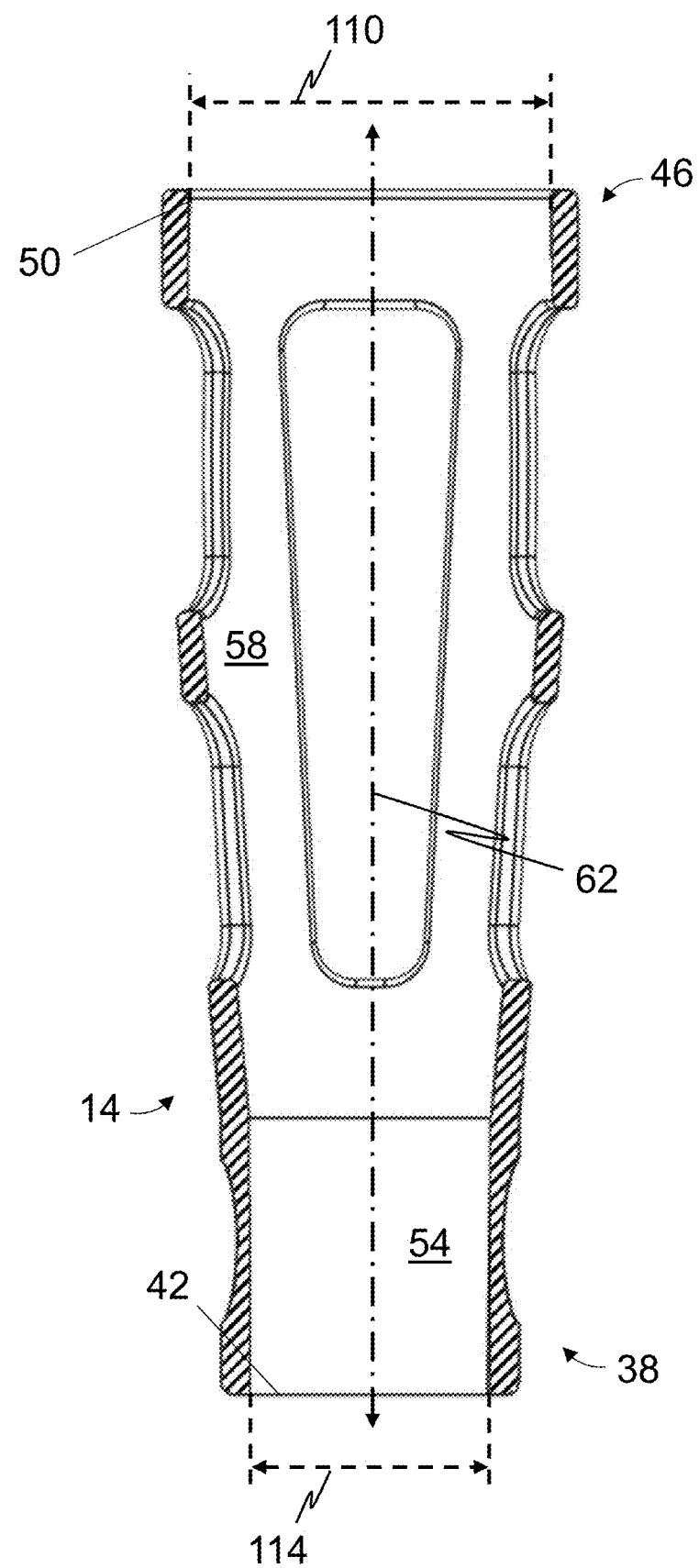
FIG. 2H is a cross-sectional side view of the holder of FIG. 2A, taken along line 2H-2H of FIG. 2E.
Figure 2I:
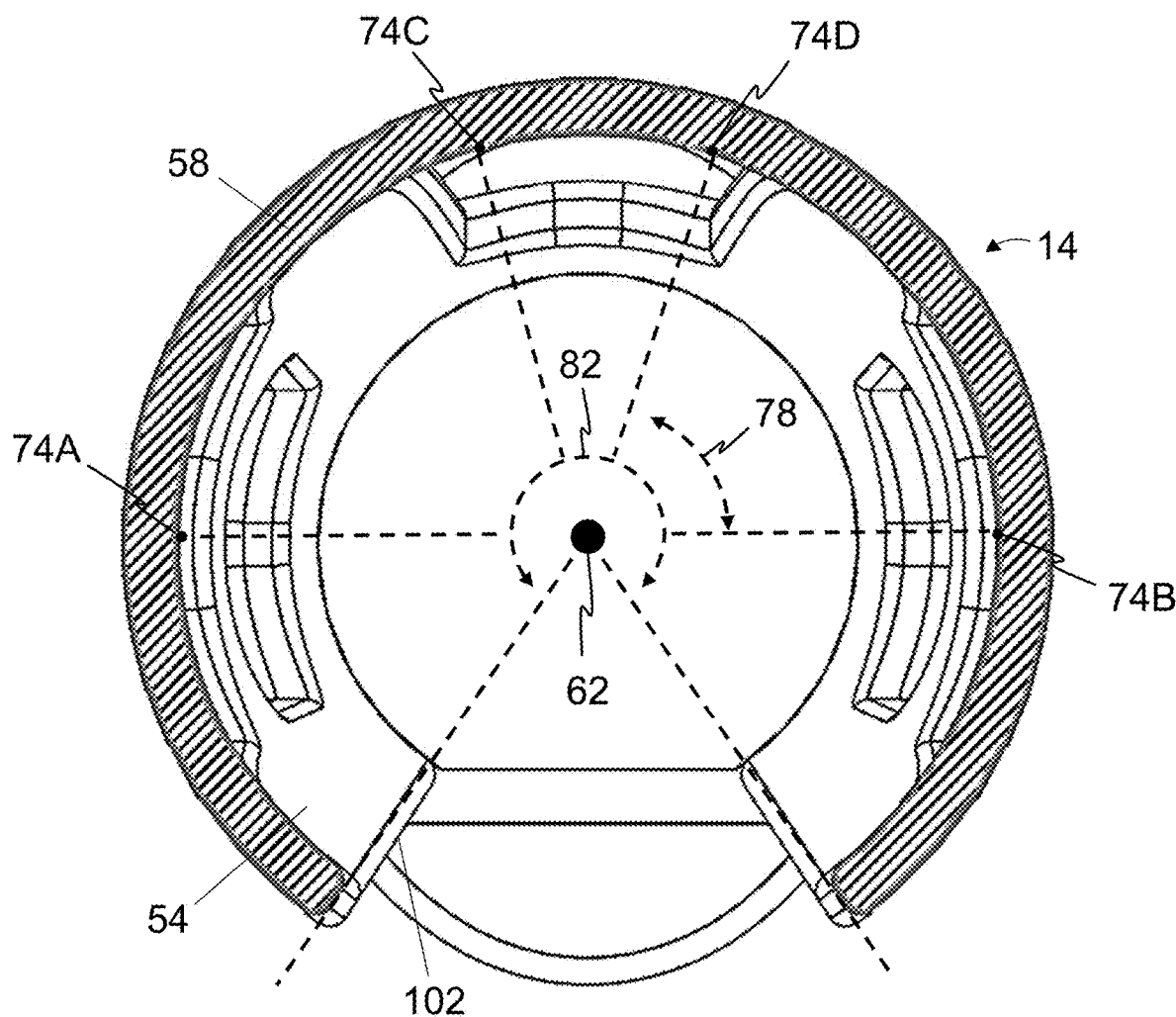
FIG. 2I is a cross-sectional top view of the holder of FIG. 2A, taken along line 2I-2I of FIG. 2F.

Sidewall 58 can define a slot 102 extending from the proximal end 38 and through the distal end 46 (FIG. 2A). Slot 102, can, for example, facilitate receipt of the device (e.g., menstrual cup 18) within channel 54, reduce friction when inserting the device, and/or the like.

Figure 3:
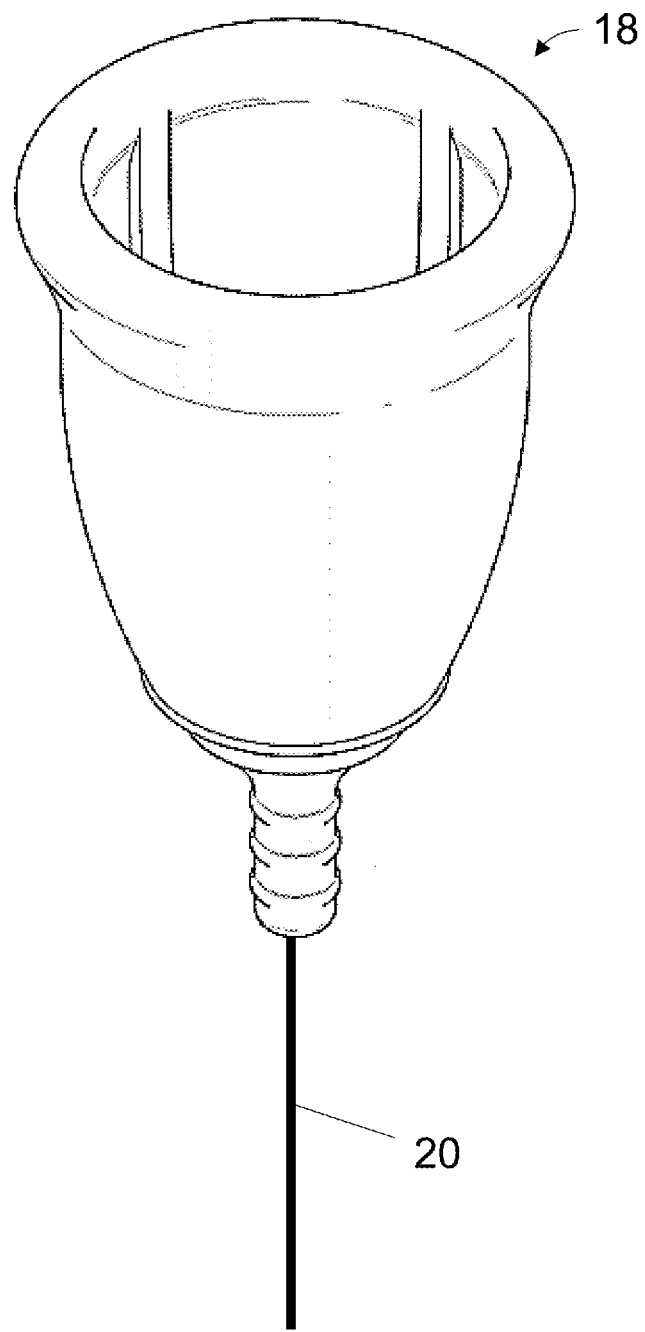
FIG. 3 is a perspective view of a menstrual cup that is suitable for use with the present applicators.

An illustrative menstrual cup 18 is shown in FIG. 3. The menstrual cup may vary in size depending on the user, their preferences, their medical history, and/or the like. For example, if the cervix is longer than average, the user may use a shorter menstrual cup to mitigate discomfort. Menstrual cup 18 can include a string 20 to facilitate removal of the menstrual cup from the vagina.

Figure 4:
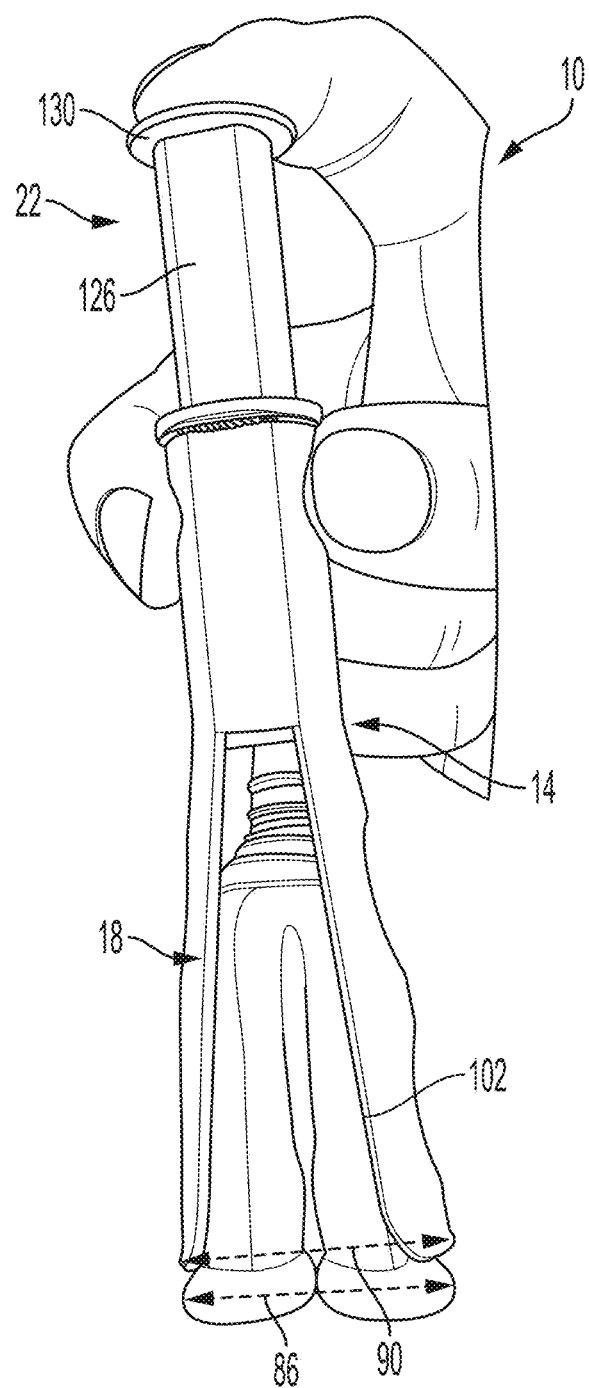
FIG. 4 is a perspective view of the applicator of FIG. 1, shown with a menstrual cup received by the holder.
Figure 5A:
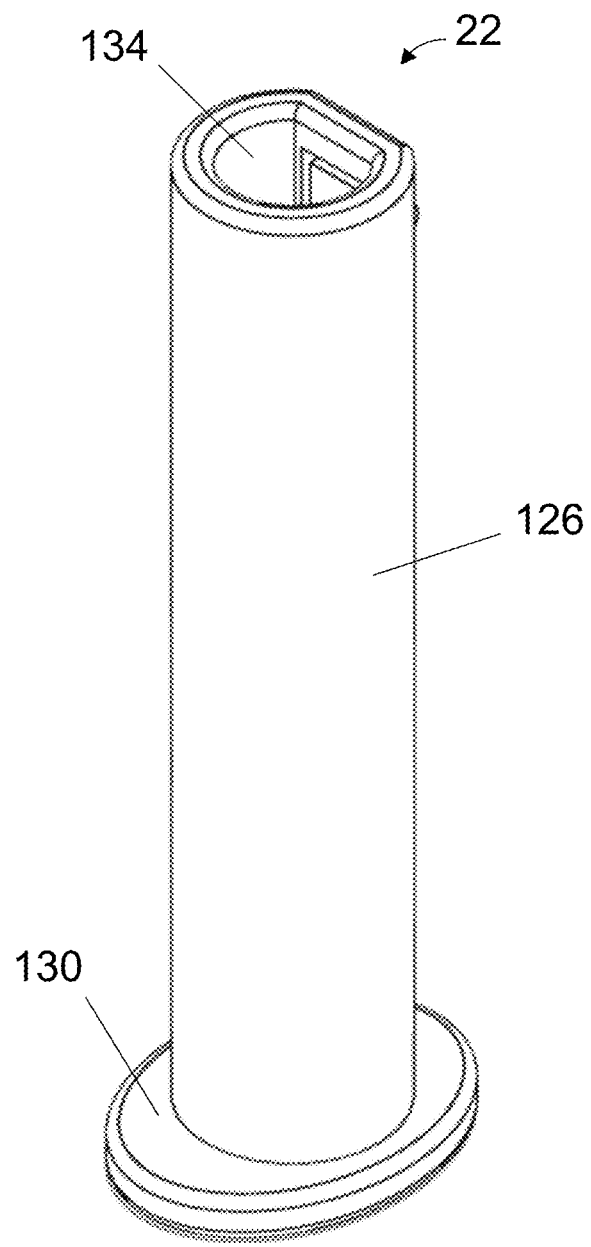
FIG. 5A is a perspective view of the plunger of FIG. 1's applicator.
Figure 5C:
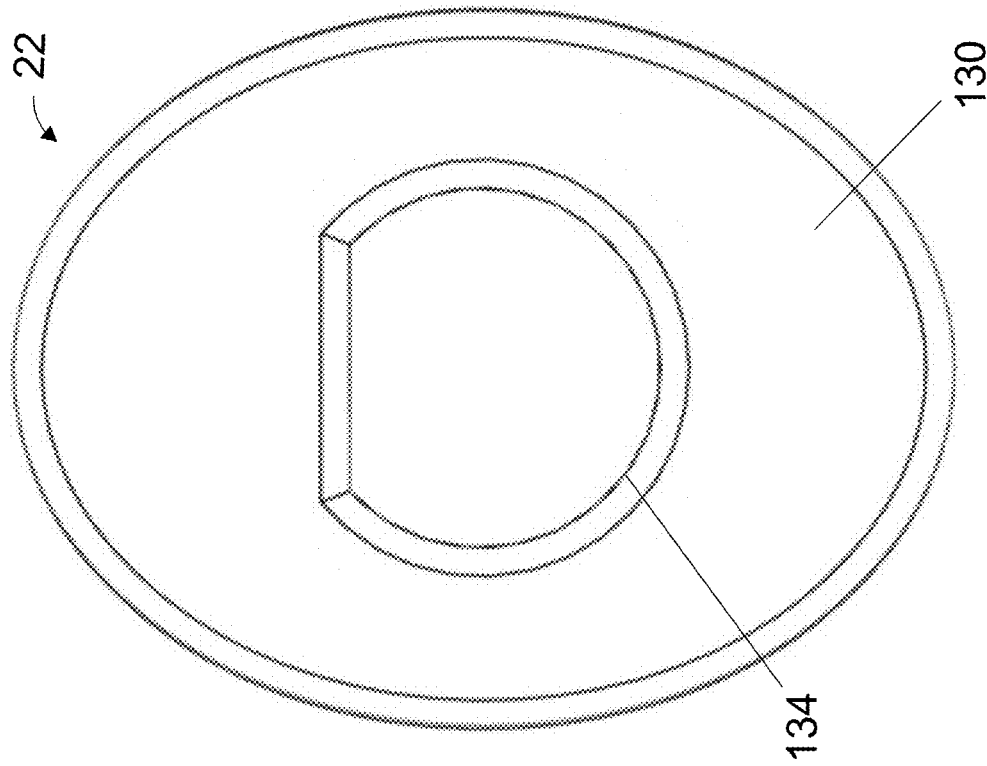
FIGS. 5B-5G are top, bottom, right, left, front, and back views, respectively, of the plunger of FIG. 5A.
Figure 5B:
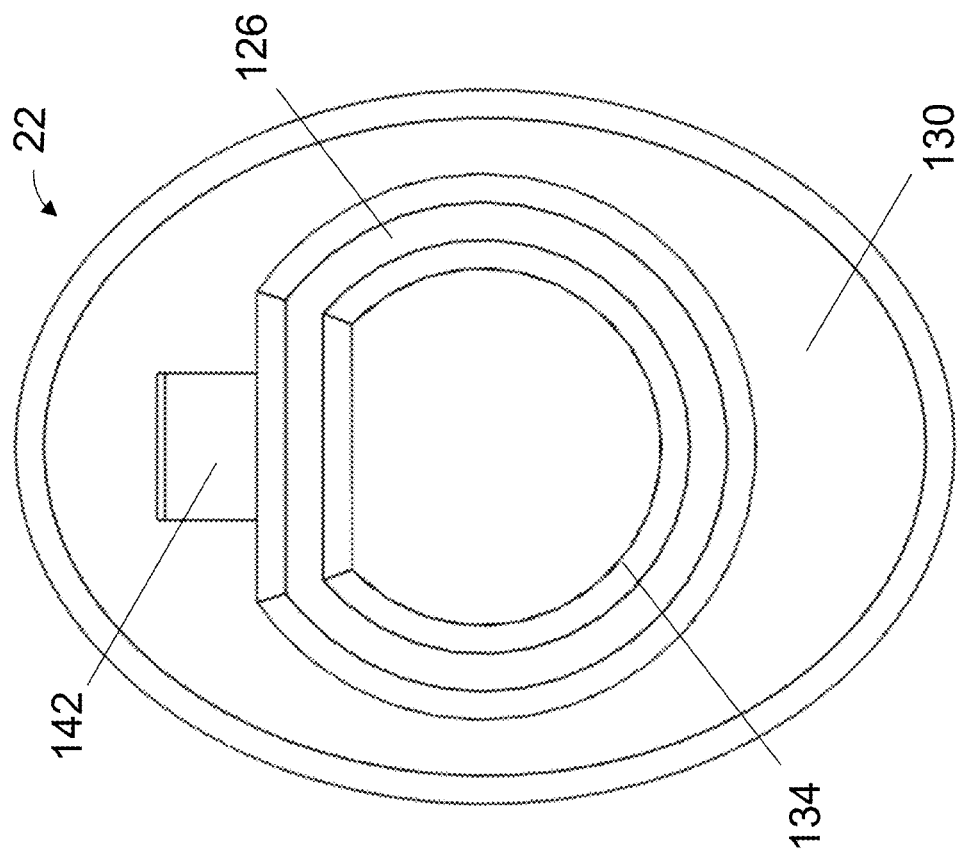
Figures 5D, 5E:
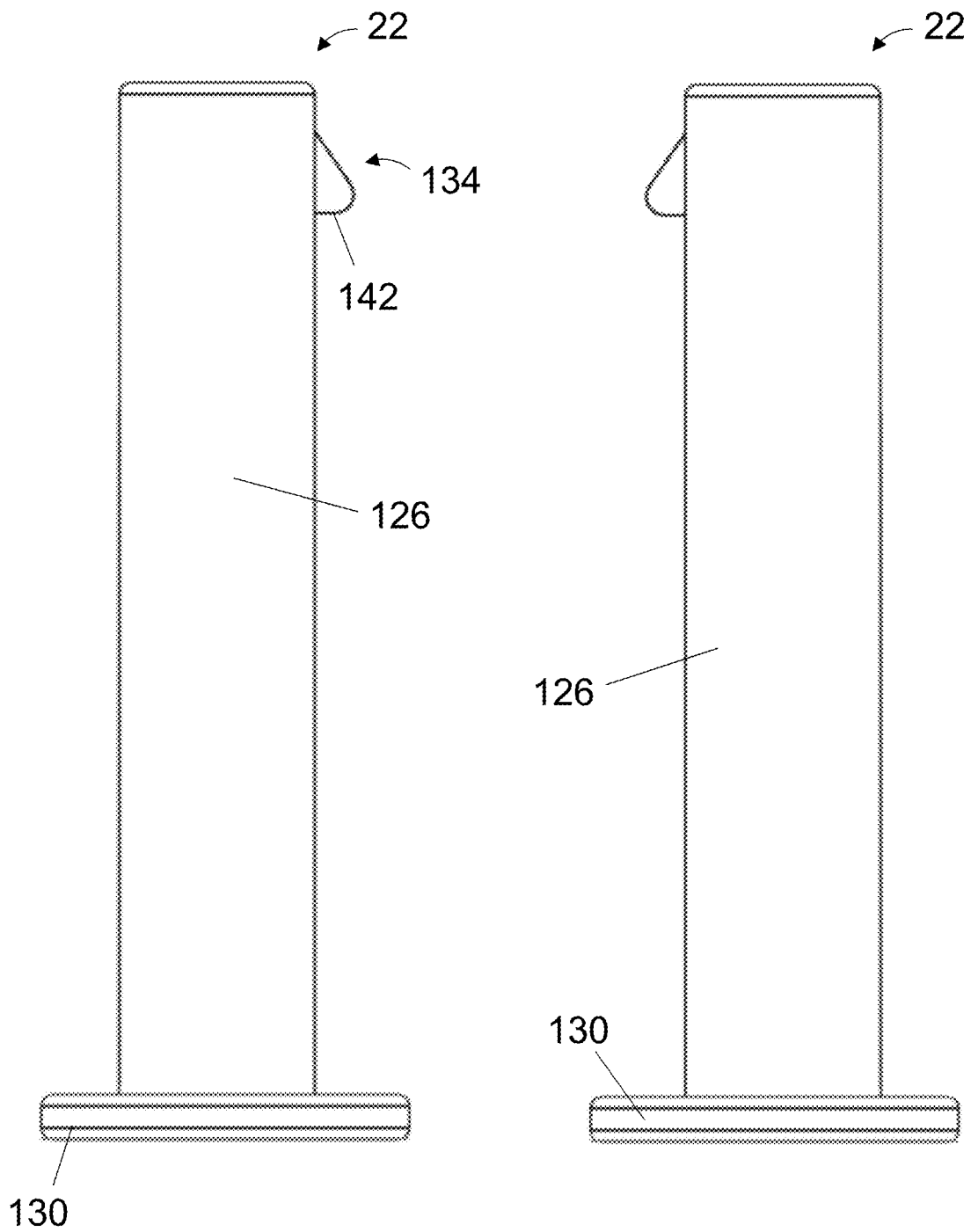
Figure 5F:
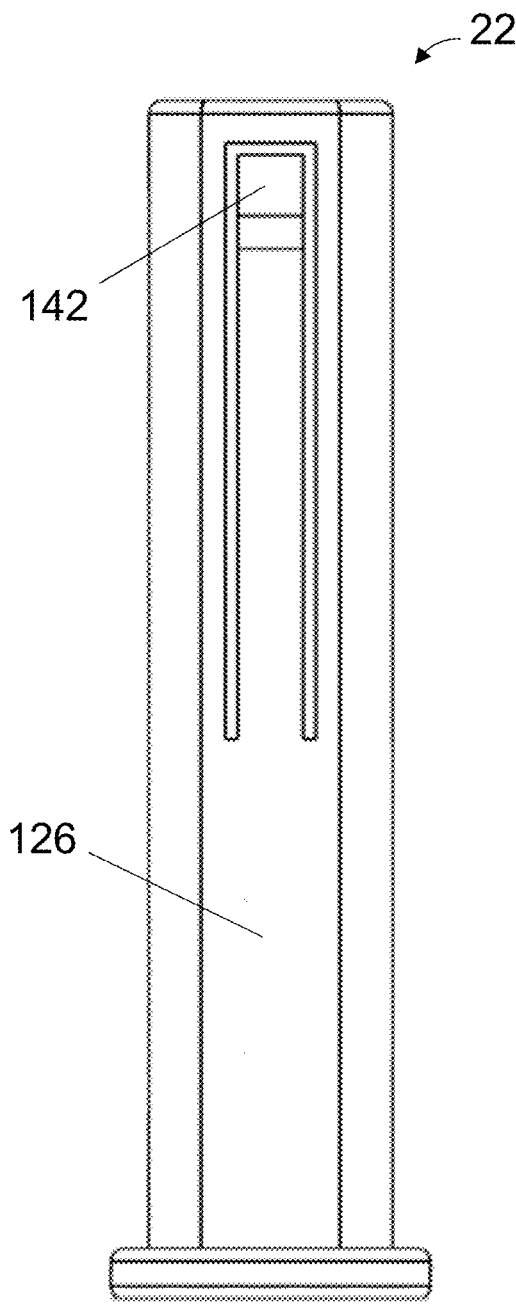
Figure 5G:
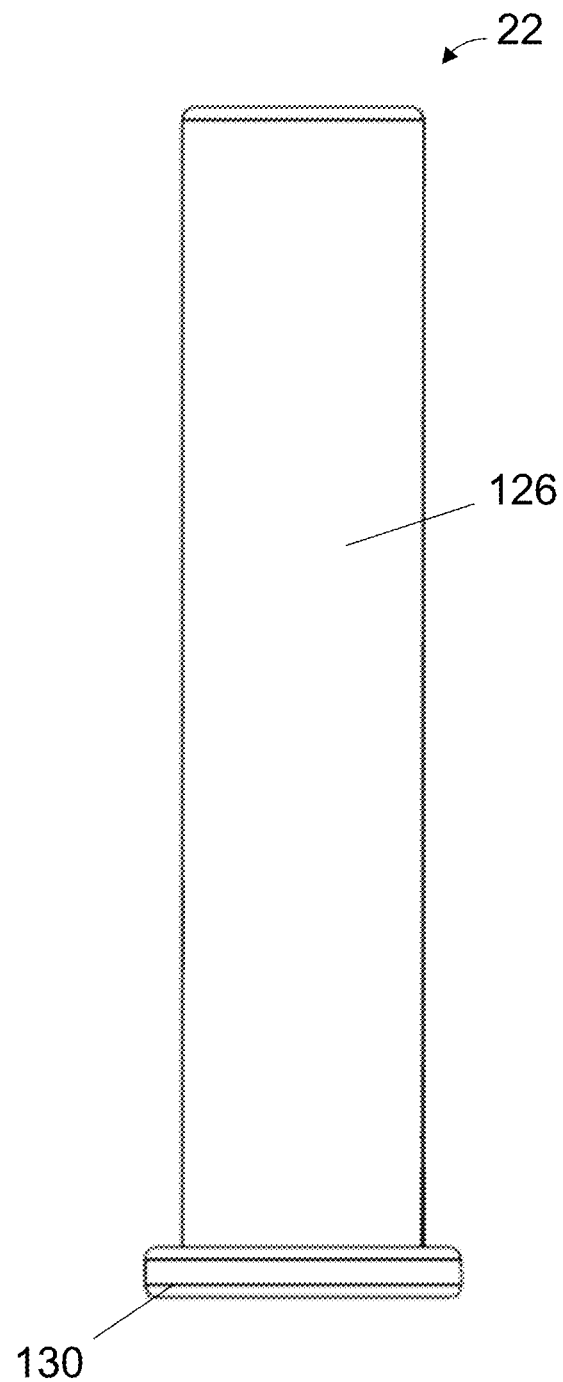

Referring additionally to FIG. 4, shown is applicator 10 with a menstrual cup 18 positioned within holder 14. Due at least in part to holder 14's ability to surround menstrual cup 18 (described above), a maximum transverse dimension 86 of the menstrual cup and the holder together can be less than or equal to any one of, or between any two of: 1.05, 1.10, 1.20, 1.30, 1.40, 1.50, 1.60, 1.70, 1.80, 1.9, and 2.0 times a maximum transverse dimension 90 of the holder alone. Maximum transverse dimensions 86 and 90 can be measured perpendicularly to channel 54's longitudinal axis 62. In this way and others, applicator 10 can increase user comfort when inserting a device (e.g., menstrual cup 18) and/or promote reliable deployment of the device. FIG. 4 further illustrates how button 130 of the plunger 22 may be depressed such that the shaft 126 pushes out the menstrual cup 18.

Referring now to FIGS. 5A-5G, shown is plunger 22. Plunger 22 can include a shaft 126 configured to be received by first opening 42 of holder 14 such that the shaft is movable within channel 54 and along longitudinal axis 62 of the channel. As shown, a button 130 can be coupled to shaft 126 to facilitate user-operation of the plunger. Plunger 22 can include an interior passageway 134, which can, for example, permit a string or the like of a device (e.g., string 20 of menstrual cup 18) to pass through the plunger, thereby facilitating receipt of the device within channel 54.

Applicator 10 can include a latch 138. As shown, latch 138 can include a protrusion 142 on shaft 126 (FIGS. 5D and 5E) and a stop 146 (FIG. 2A) on holder 14 that is engageable with the protrusion to restrict movement of plunger 22 relative to holder 14. Other configurations are possible; for example, a protrusion (e.g., 142) can be a feature of holder 14, and a stop (e.g., 146) can be a feature of plunger 22. To illustrate, latch 138 can be configured to restrict movement of shaft 126 of plunger 22 out of first opening 42 of holder 14 via engagement of protrusion 142 and stop 146. And as shown, latch can further be configured to do so without restricting movement of shaft 126 toward distal end 46 of holder 14. In this way, use of applicator 10 is facilitated in that plunger 22 remains retained by holder 14 and operable no matter the orientation of the applicator.

Figure 6A:
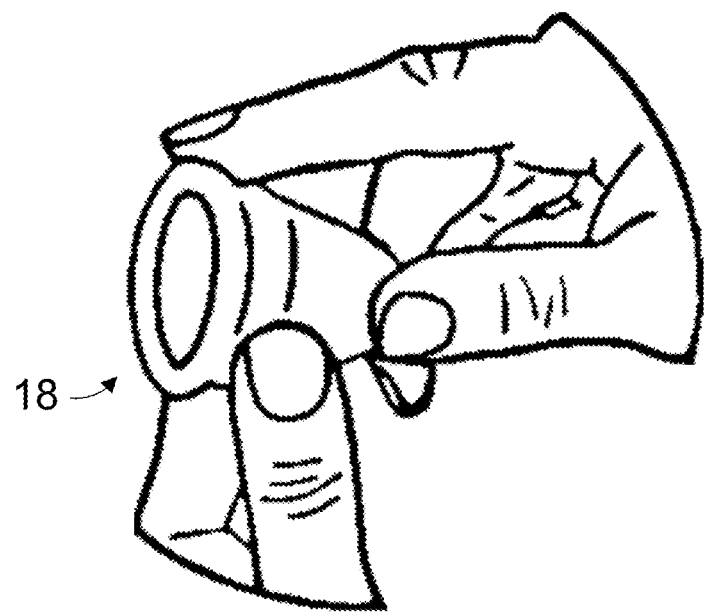
FIGS. 6A-6H illustrate a method of positioning a menstrual cup within a vagina using one of the present applicators.
Figure 6B:
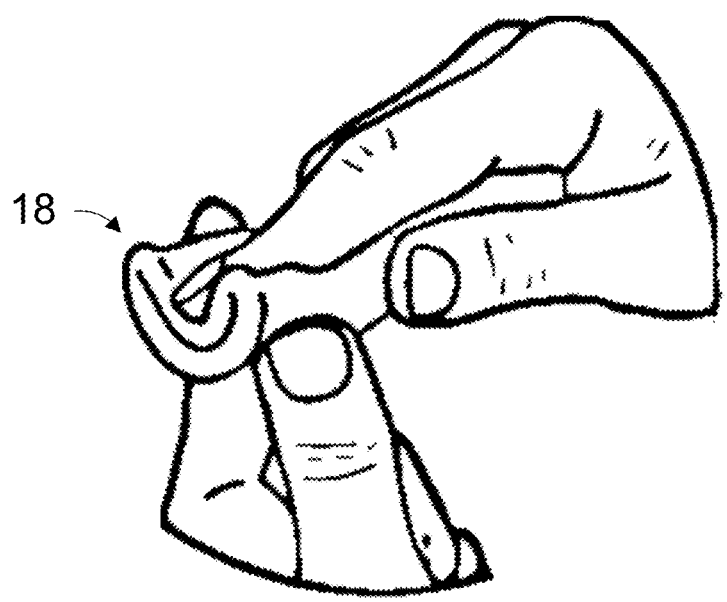
Figure 6C:
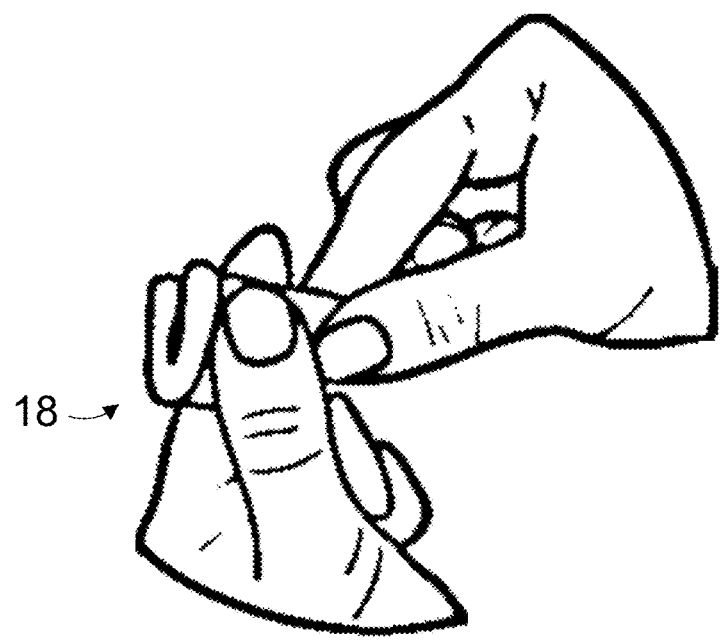
Figure 6D:
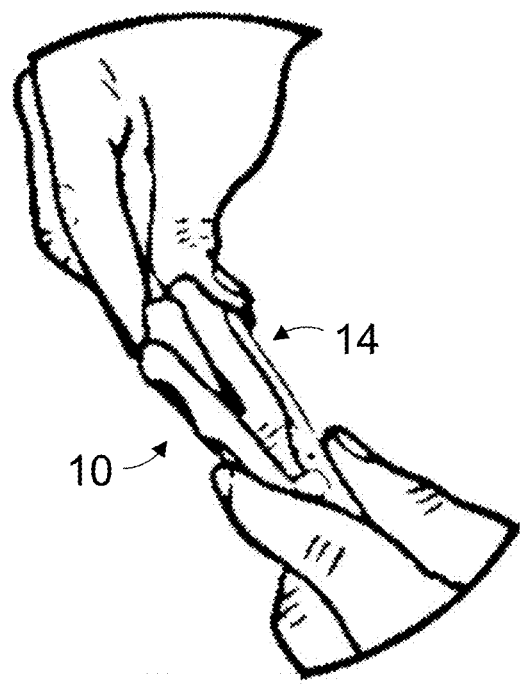
Figure 6E:
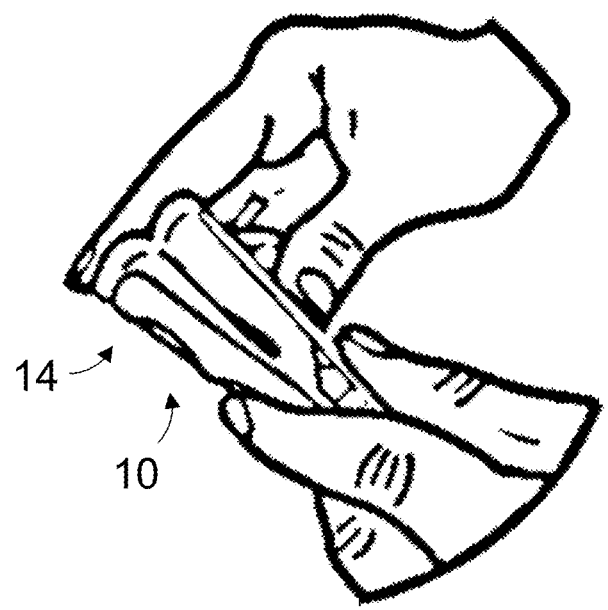

Some of the present methods of preparing a device for receipt by a holder (e.g., 14) (e.g., FIGS. 6A-6C), positioning the device within the holder (e.g., FIG. 6D-6E), and positioning the device within the vagina (e.g., FIGS. 6F-6H) comprise folding the device (e.g., menstrual cup 18). For example, FIG. 6A, shows an exemplary hand position for folding menstrual cup 18, FIG. 6B shows pressure being applied to the menstrual cup to begin the folding, and FIG. 6C shows the folded menstrual cup. The device can then be disposed within a channel (e.g., 54) of the holder, the channel extending between a proximal end (e.g., 38) of the holder that defines a first opening (e.g., 42) and a distal end (e.g., 46) of the holder that defines a second opening (e.g., 50) (FIGS. 6D-6E). In some methods, the disposing can be such that a maximum transverse dimension of the device and the holder together (e.g., 86) is less than 1.5 times a maximum transverse dimension of the holder alone (e.g., 90), wherein each of the maximum transverse dimensions is measured perpendicularly to a longitudinal axis (e.g., 62) of the channel. This can be facilitated, at least in part, by the holder surrounding the device as described above.

Figure 6F:
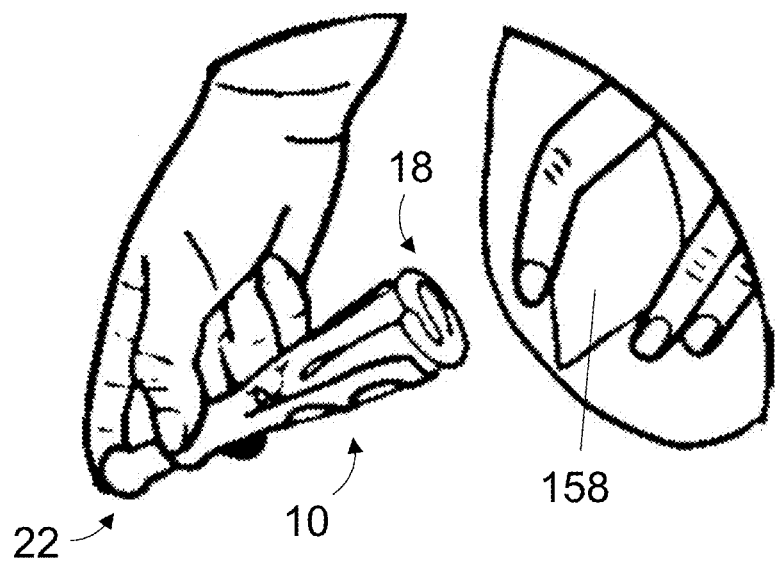
Figure 6G:
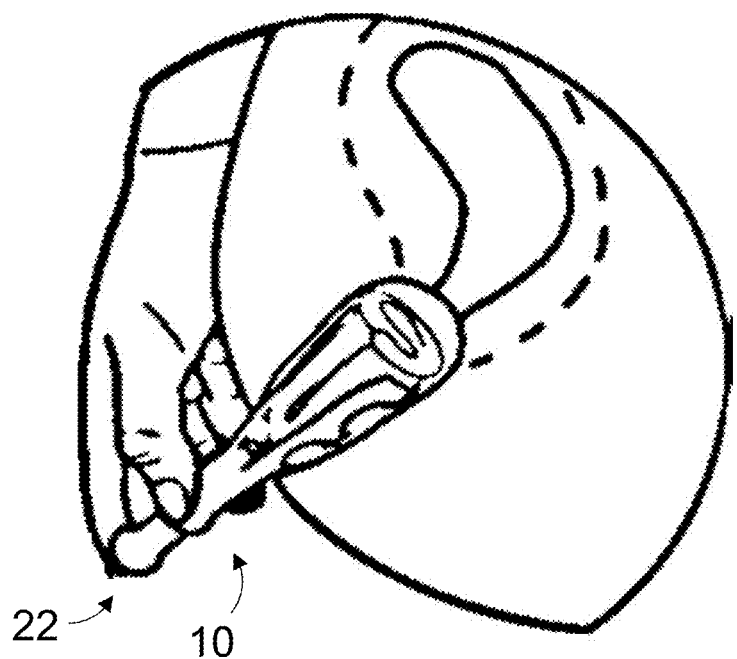
Figure 6H:
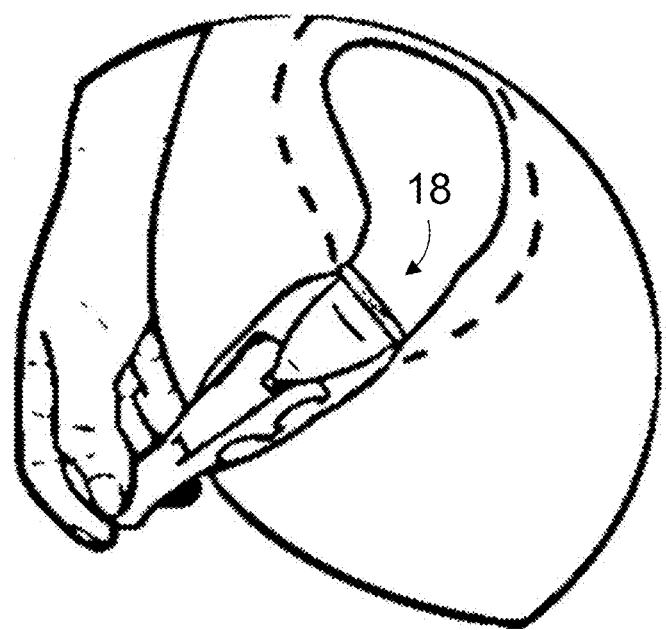
Figure 7A:
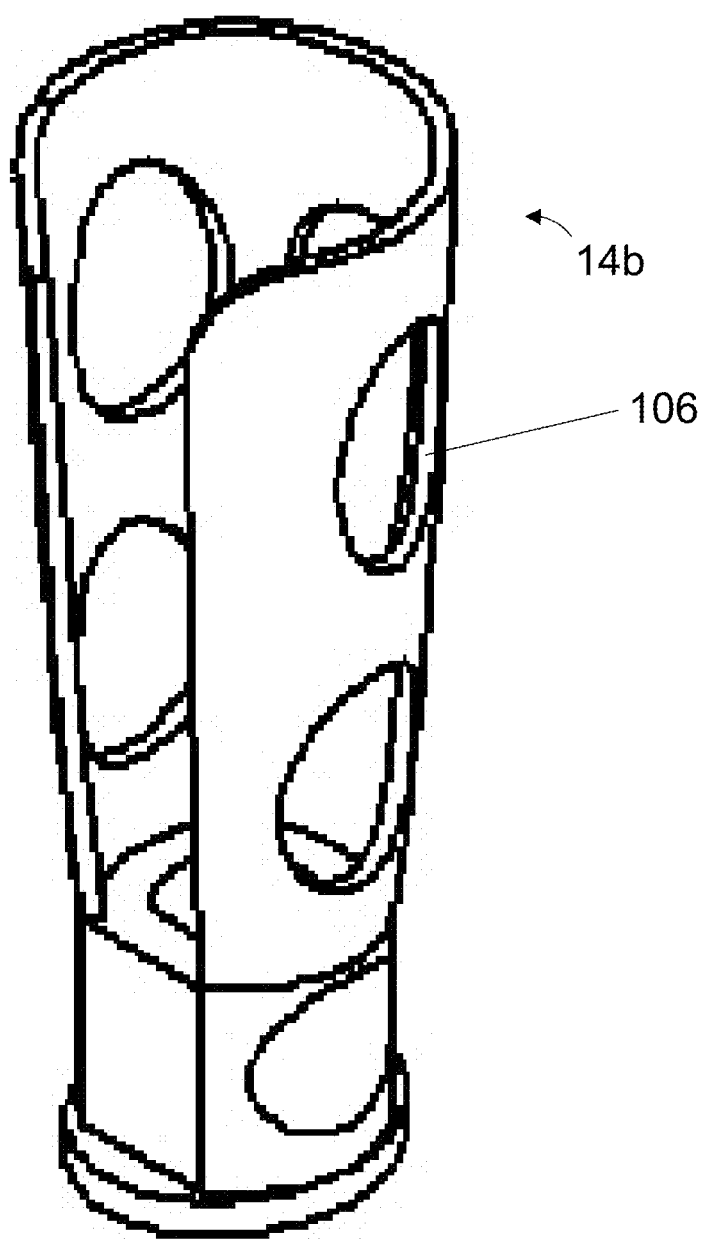
FIG. 7A is a perspective view of a holder that is suitable for use with the present applicators.
Figure 7B:
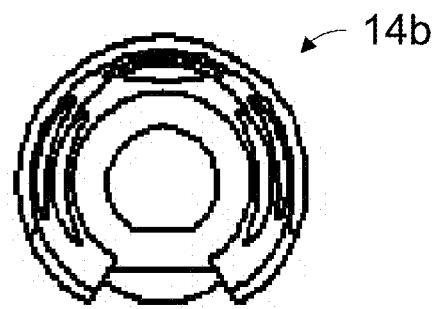
FIGS. 7B-7D are top, back, and side views, respectively, of the holder of FIG. 7A.
Figure 7C:
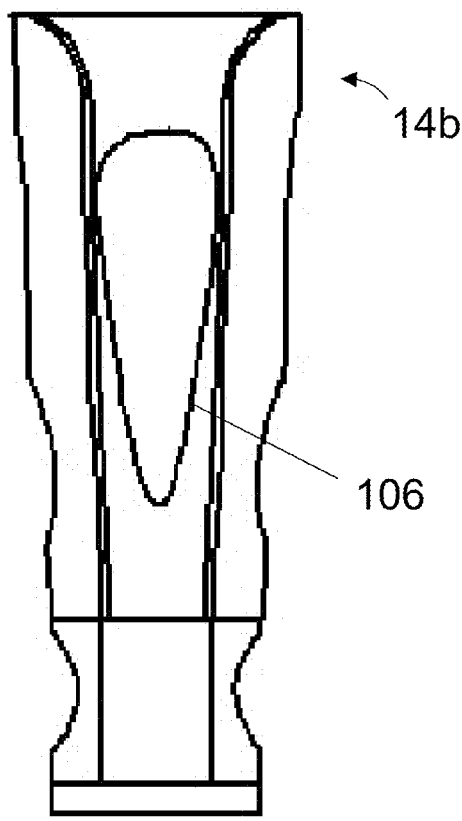
Figure 7D:
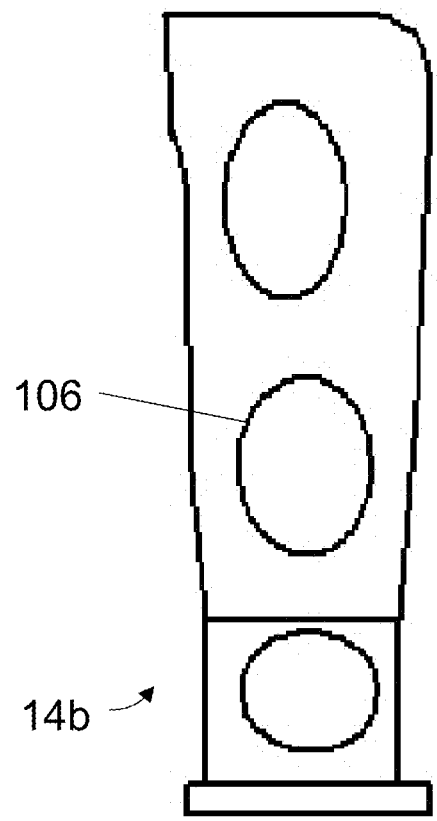

Referring now to FIG. 6F, the user can position applicator 10 to insert the device (e.g., menstrual cup 18) and the holder into the vagina (e.g., 158) by aligning the distal end of the holder with the opening of the vagina. Then, as shown in FIGS. 6G and 6H, the user can insert the applicator into the vagina and actuate a plunger (e.g., 22) of the applicator such that a shaft (e.g., 126) of the plunger moves within the channel and along the longitudinal axis of the channel to expel the device from the channel via the second opening. The applicator can subsequently be removed from the vagina, leaving the device inside the vagina.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A menstrual cup applicator comprising:
   a holder having:
      a proximal end defining a first opening; and
      a distal end defining a second opening;
      wherein the holder defines a channel extending between the first and second openings, the channel:
         having a longitudinal axis; and
         being configured to receive a menstrual cup; and
      wherein a maximum transverse dimension of the second opening is at least 1.5 times a maximum transverse dimension of the first opening, each of the maximum transverse dimensions being measured perpendicularly to the longitudinal axis and between portions of the holder; and
   a plunger having a shaft configured to be received by the first opening such that the shaft is movable within the channel and along the longitudinal axis of the channel;
   wherein the holder includes a sidewall that defines at least a portion of the channel, and a portion of the sidewall at the distal end subtends an angle that is between 270 and 330 degrees about the longitudinal axis.

2. The menstrual cup applicator of claim 1, wherein the sidewall defines a slot extending from the proximal end and through the distal end.

3. The menstrual cup applicator of claim 1, wherein the sidewall defines a plurality of openings in fluid communication with the channel.

4. The menstrual cup applicator of claim 1, wherein the sidewall flares toward the distal end.

5. The menstrual cup applicator of claim 1, comprising a latch configured to restrict movement of the shaft of the plunger out of the first opening of the holder.

6. The menstrual cup applicator of claim 5, wherein the latch is configured to restrict movement of the shaft of the plunger out of the first opening of the holder without restricting movement of the shaft toward the distal end of the holder.

7. The menstrual cup applicator of claim 1, wherein the plunger defines an interior passageway configured to permit a string of the menstrual cup to pass through the plunger.

8. A method of positioning a menstrual cup within a vagina, the method comprising:
   disposing a menstrual cup within a channel of a holder, the channel extending between a proximal end of the holder that defines a first opening and a distal end of the holder that defines a second opening, the disposing such that:
      a maximum transverse dimension of the menstrual cup and the holder together is less than 1.5 times a maximum transverse dimension of the holder alone;
      wherein each of the maximum transverse dimensions is measured perpendicularly to a longitudinal axis of the channel;
   inserting the menstrual cup and the holder into the vagina; and
   actuating a plunger having a shaft received by the first opening such that the shaft moves within the channel and along the longitudinal axis to expel the menstrual cup from the channel via the second opening;
   wherein the holder includes a sidewall that defines at least a portion of the channel and bounds the menstrual cup when the menstrual cup is disposed within the channel, and a portion of the sidewall that bounds the menstrual cup when the menstrual cup is disposed within the channel subtends an angle that is between 270 and 330 degrees about the longitudinal axis.

9. The method of claim 8, wherein disposing the menstrual cup within the channel is performed such that the menstrual cup is bounded by:
   first and second points on the holder that are angularly disposed from one another about the longitudinal axis by an angle of 180 degrees; and
   third and fourth points on the holder that are:
      angularly disposed between the first and second points about the longitudinal axis; and
      angularly disposed from respective ones of the first and second points about the longitudinal axis by an angle that is between 50 and 85 degrees.

10. The method of claim 8, wherein:
    the sidewall defines a slot extending from the proximal end and through the distal end; and
    disposing the menstrual cup within the channel is performed by passing at least a portion of the menstrual cup through the slot.

11. The method of claim 8, wherein the sidewall defines a plurality of openings in fluid communication with the channel.

12. The method of claim 8, wherein a maximum transverse dimension of the second opening is at least 1.5 times a maximum transverse dimension of the first opening, each of the maximum transverse dimensions being measured perpendicularly to the longitudinal axis and between portions of the holder.

13. A menstrual cup applicator comprising:
    a holder having:
       a proximal end defining a first opening; and
       a distal end defining a second opening;
       wherein the holder defines a channel extending between the first and second openings, the channel:
          having a longitudinal axis; and
          being configured to receive a menstrual cup; and
       wherein a maximum transverse dimension of the second opening is at least 1.5 times a maximum transverse dimension of the first opening, each of the maximum transverse dimensions being measured perpendicularly to the longitudinal axis and between portions of the holder; and a plunger having a shaft configured to be received by the first opening such that the shaft is movable within the channel and along the longitudinal axis of the channel;

wherein the holder includes a sidewall that defines at least a portion of the channel, and the sidewall defines a slot extending from the proximal end and through the distal end.

14. The menstrual cup applicator of claim 13, wherein the sidewall defines a plurality of openings in fluid communication with the channel.

15. The menstrual cup applicator of claim 13, wherein the sidewall flares toward the distal end.

16. The menstrual cup applicator of claim 13, comprising a latch configured to restrict movement of the shaft of the plunger out of the first opening of the holder.

17. The menstrual cup applicator of claim 13, wherein the latch is configured to restrict movement of the shaft of the plunger out of the first opening of the holder without restricting movement of the shaft toward the distal end of the holder.

18. The menstrual cup applicator of claim 13, wherein the plunger defines an interior passageway configured to permit a string of the menstrual cup to pass through the plunger.

\* \* \* \* \*